United States Patent
Yi et al.

(10) Patent No.: US 10,255,514 B2
(45) Date of Patent: Apr. 9, 2019

(54) AUTOMATIC IDENTIFICATION OF CLONED VEHICLE IDENTIFIERS

(71) Applicant: SAP SE, Walldorf (DE)

(72) Inventors: Chang Yi, Shanghai (CN); Qiong Luo, Nanjing (CN); Guangji Zhu, Nanjing (CN); Chao Yu, Nanjing (CN); Qiwei Zhang, Shanghai (CN); Yinling Ni, Shanghai (CN)

(73) Assignee: SAP SE (DE)

( * ) Notice: Subject to any disclaimer, the term of this patent is extended or adjusted under 35 U.S.C. 154(b) by 22 days.

(21) Appl. No.: 15/681,931

(22) Filed: Aug. 21, 2017

(65) Prior Publication Data
US 2019/0057275 A1  Feb. 21, 2019

(51) Int. Cl.
G06K 9/00 (2006.01)
G06K 9/34 (2006.01)

(52) U.S. Cl.
CPC ......... *G06K 9/344* (2013.01); *G06K 2209/01* (2013.01); *G06K 2209/15* (2013.01)

(58) Field of Classification Search
None
See application file for complete search history.

(56) References Cited

U.S. PATENT DOCUMENTS

| | | | | |
|---|---|---|---|---|
| 5,568,406 A * | 10/1996 | Gerber | ............ | B60R 13/10 116/63 R |
| 7,382,244 B1 * | 6/2008 | Donovan | ........ | G08B 13/19645 340/506 |
| 9,031,948 B1 * | 5/2015 | Smith | ............ | G06F 17/30 707/736 |
| 9,761,135 B2 * | 9/2017 | Chen | ............ | G08G 1/0175 |
| 9,779,309 B1 * | 10/2017 | Fink | ............ | G06K 9/00771 |
| 2004/0210757 A1 * | 10/2004 | Kogan | ............ | B60R 25/00 713/182 |
| 2007/0057817 A1 * | 3/2007 | Aman | ............ | G08G 1/017 340/933 |
| 2007/0208681 A1 * | 9/2007 | Bucholz | ............ | G08G 1/017 706/47 |
| 2008/0147253 A1 * | 6/2008 | Breed | ............ | B60W 30/16 701/3 |

(Continued)

FOREIGN PATENT DOCUMENTS

| CN | 103794051 A | * | 5/2014 |
|---|---|---|---|
| CN | 103473930 B | * | 1/2016 |

*Primary Examiner* — Shervin K Nakhjavan
(74) *Attorney, Agent, or Firm* — Sterne, Kessler, Goldstein & Fox P.L.L.C.

(57) ABSTRACT

Disclosed herein are system, method, and computer program product embodiments for automatically detecting cloned vehicle identifiers. An embodiment operates by determining legitimate trajectory information and illegitimate trajectory information corresponding to vehicular travel in a geographic area, and training a decision model to detect a cloned vehicle identifier based on the legitimate trajectory information and the illegitimate trajectory information. Furthermore, the embodiment identifies vehicles potentially using a cloned vehicle identifier based on the decision model and common driving patterns within the geographic area. In some embodiments, enforcement agents are notified of the vehicles potentially using a cloned vehicle identifier.

20 Claims, 4 Drawing Sheets

(56) References Cited

U.S. PATENT DOCUMENTS

| | | | | |
|---|---|---|---|---|
| 2013/0215273 A1* | 8/2013 | Kareev | ................ | G08G 1/0175 348/149 |
| 2014/0152472 A1* | 6/2014 | Tseng | .................... | G08G 1/146 340/932.2 |
| 2014/0334684 A1* | 11/2014 | Strimling | ........... | G06K 9/00771 382/105 |
| 2014/0376778 A1* | 12/2014 | Muetzel | ............... | G06K 9/3258 382/105 |
| 2015/0049914 A1* | 2/2015 | Alves | .................... | G06K 9/033 382/105 |
| 2016/0078759 A1* | 3/2016 | Nerayoff | .............. | G06Q 20/145 701/3 |
| 2017/0041737 A1* | 2/2017 | Fischer | ............... | H04W 64/006 |
| 2017/0185868 A1 | 6/2017 | Wang et al. | | |
| 2018/0007521 A1* | 1/2018 | Meredith | ................ | H04W 4/08 |
| 2018/0204459 A1* | 7/2018 | Bradley | ................ | G08G 1/164 |
| 2018/0240336 A1* | 8/2018 | Kareev | ............. | G06K 9/00771 |

\* cited by examiner

AUTOMATIC IDENTIFICATION OF CLONED VEHICLE IDENTIFIERS

CROSS REFERENCE TO RELATED APPLICATIONS

This application is related to co-pending U.S. patent application Ser. No. 15/681,961, filed Aug. 21, 2017, by Yi, et al., "Automatic Detection and Correction of License Plate Misidentification," filed herewith which is hereby incorporated by reference in its entirety.

BACKGROUND

In order to maintain safety on traffic roads and monitor traffic patterns, it is important that vehicles be properly registered and identifiable. As a result, most jurisdictions require that a driver obtain a vehicle identifier, and display the vehicle identifier while using a vehicle. For example, many jurisdictions require that vehicles display a license plate engraved with an alphanumeric vehicle identifier. In order to illegally circumvent these requirements, some drivers use counterfeit license plates with cloned vehicle identifiers. In other words, for example, these drivers utilize license plates that display vehicle identifiers that were issued to another driver and/or vehicle. Drivers using cloned vehicle identifiers may be more likely to violate traffic regulations and illegally offer taxi services, for example, thus endangering the public safety. However, existing technologies have been unable to detect cloned vehicle identifiers efficiently, much less at a scale applicable to the set of vehicle identifiers.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically detecting a cloned vehicle identifier.

Figure 1:
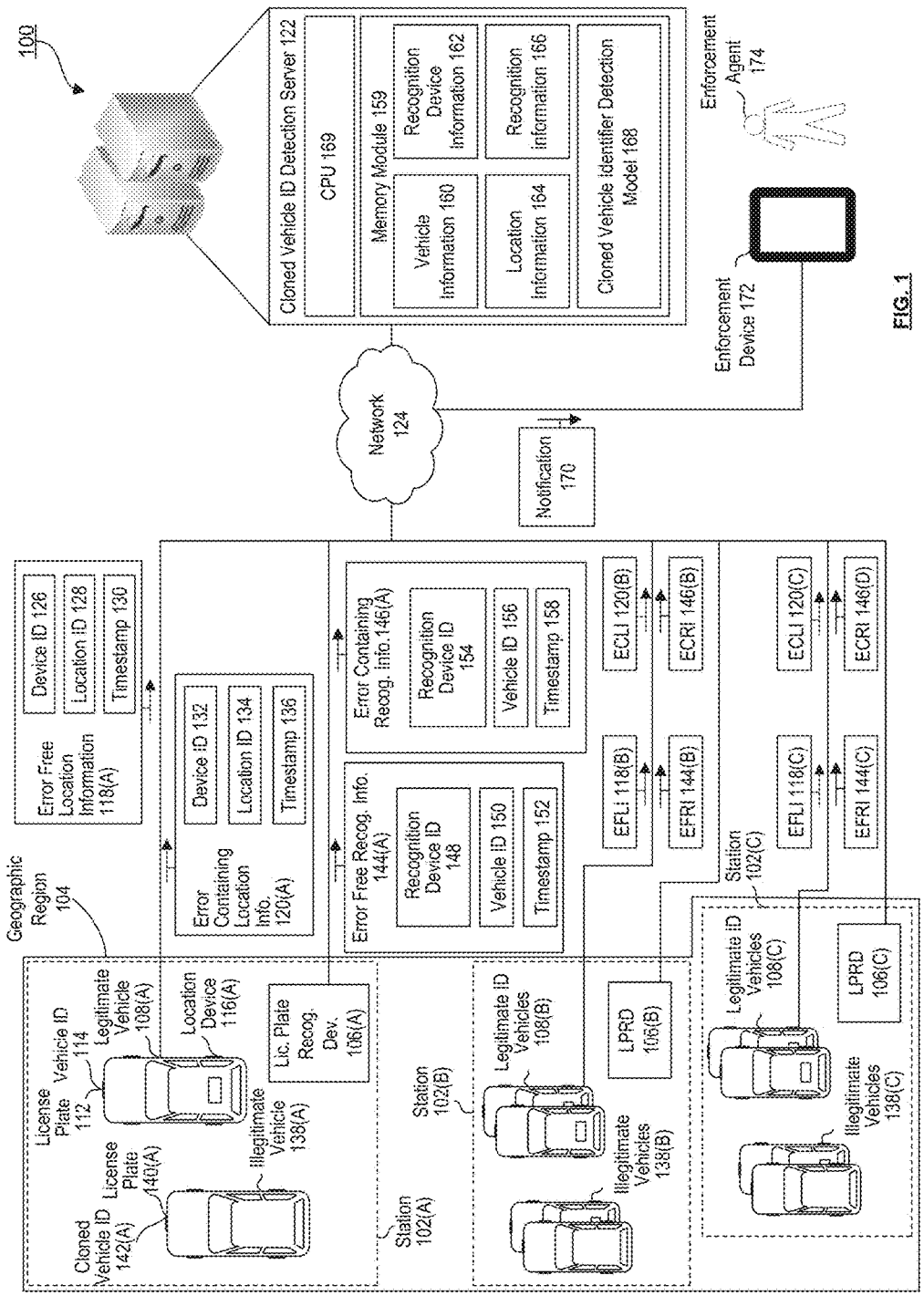
FIG. 1 illustrates a block diagram of an example framework for providing a cloned vehicle identifier detection system, according to some embodiments.

FIG. 1 illustrates a block diagram of an example framework for providing a cloned vehicle identifier detection system 100, according to some embodiments. As illustrated in FIG. 1, the cloned vehicle identifier detection system 100 may include a plurality of driving stations 102 (e.g., a driving station 102(A), a driving station 102(B), and a driving station 102(C)). Although three driving stations 102 are shown in FIG. 1, the embodiments described herein are applicable to any number of driving stations 102. In some embodiments, the driving stations 102 may be placed at predetermined locations throughout a geographic region 104 for collecting information about vehicles traveling within the geographic region 104. For instance, the driving stations 102 may be distributed at busy intersections in a city, for example, or at any points of ingress or egress of a particular area, such as at highway on-ramps, off-ramps, in some embodiments, or at toll booths or checkpoints, in other embodiments.

Individual driving stations 102 may be equipped with one or more license plate recognition devices 106. For example, the driving station 102(A) may be equipped with a license plate recognition device 106(A), the driving station 102(B) may be equipped with a license plate recognition device 106(B), and so forth. Further, the license plate recognition devices 106 may perform automatic recognition of license plate information as vehicles travel in the vicinity of the driving stations 102. In some embodiments, the license plate recognition devices 106 may capture one or more images of a front and/or rear license plate of a vehicle, and perform a recognition algorithm (e.g., optical character recognition) on the images to determine a vehicle identifier displayed on the license plate.

In the example of FIG. 1, a plurality of legitimate vehicles 108 are traveling throughout the geographic region 104. In some embodiments, each of the legitimate vehicles 108 may include one or more license plates 112 that display a legitimate vehicle identification number 114. In some embodiments, the legitimate vehicle identification numbers 114 include alphanumeric characters, graphics, special symbols, etc.

Each legitimate vehicle 108 may also include a location device 116 that determines a location of the legitimate vehicle 108. Some examples of a location device 116 include global navigation satellite system (GNSS) receivers, global positioning system (GPS) receivers, global'naya navigatsionnaya sputnikovaya sistema (GLONASS) receivers, BeiDou receivers, GALILEO receivers, Quasi-Zenith Satellite System (QZSS) receivers, Doppler Orbitography and Radio-positioning Integrated by Satellite (DORIS) receivers, Indian Regional Navigational Satellite System (IRNSS) receivers, and so forth.

As illustrated in FIG. 1, the plurality of legitimate vehicles 108 may send error free location information 118 and error containing location information 120 to a cloned vehicle identifier detection server 122 via a network 124. The network 124 may include any or all of a cellular network, Wi-Fi network, satellite communication network, etc. The error free location information 118 may include a location device identifier 126 that identifies the location device 116, a location identifier 128 (e.g., latitude and longitude) corresponding to the location of the legitimate vehicle 108, and a timestamp 130 indicating the time and/or date that the legitimate vehicle 108 is present at the location. In addition, the error containing location information 120 may include a location device identifier 132 that identifies the location device 116, a location identifier 134 corresponding to the location of the legitimate vehicle 108, and a timestamp 136 indicating the time and/or date that the legitimate vehicle 108 is present at the location. Further, the error containing location information 120 may include an incorrect value for at least one of the location device identifier 132, the location identifier 134, or the timestamp 136.

Further, in the example of FIG. 1, a plurality of illegitimate vehicles 138 are traveling throughout the geographic region 104. In addition, each of the illegitimate vehicles 138 may include one or more license plates 140 that display a cloned vehicle identification number 142. As the legitimate vehicles 108 and illegitimate vehicles 138 travel through the driving stations 102, the license plate recognition devices 106 may attempt to identify the legitimate vehicle identification numbers 114 on the license plates 112, and the cloned vehicle identification numbers 142 on the license plates 140, respectively. Further, the license plate recognition devices 106 may send the identified legitimate vehicle identification numbers 114 and the identified the cloned vehicle identification numbers 142 to the cloned vehicle identifier detection server 122 within the error free recognition information 144 or the error containing recognition information 146.

In some embodiments, the error free recognition information 144 may include a recognition device identifier 148 that identifies the license plate recognition device 106 sending the error free recognition information 144, a vehicle identifier 150 recognized by the license plate recognition device 106, and/or a timestamp 152 indicating a time and date the license plate recognition device 106 captured images of the vehicle identifier 150. Additionally, the error containing recognition information 146 may include a recognition device identifier 154 that identifies the license plate recognition device 106 sending the error containing recognition information 146, a vehicle identifier 156 recognized the license plate recognition device 106, and/or a timestamp 158 indicating a time and date the license plate recognition device 106 captured images of the vehicle identifier 156. Further, the error containing recognition information 146 may include an incorrect value for at least one of the recognition device identifier 154, the vehicle identifier 156, or the timestamp 158. In some embodiments, the incorrect values may be due to image deficiencies, character recognition errors, timing information errors, recognition algorithm limitations, weather conditions, poor illumination, a passing speed of a vehicle, one or more objects obstructing the vehicle identifier of a license plate, one or more objects limiting a field of a view of the license plate recognition device, or license plate recognition device sensor malfunction, to name just some examples.

As described in detail above, the cloned vehicle identifier detection server 122 may receive the error free location information 118, error containing location information 120, error free recognition information 144, and error containing recognition information 146, or any combination thereof. Further, the cloned vehicle identifier detection server 122 may determine whether any of the legitimate vehicle identification numbers 114 are being used as the cloned vehicle identification numbers 142 on the license plates 140 of the illegitimate vehicles 138. The cloned vehicle identifier detection server 122 may include a memory module 159. In the example of FIG. 1, the memory module 159 may include vehicle information 160, recognition device information 162, location device information 164, recognition information 166, and a cloned vehicle identifier detection model 168.

The memory module 159 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. The memory module 159 may store machine-executable instructions, data, and various software components for implementing the techniques described herein, all of which may be processed by the CPU 169. Additionally, or alternatively, the various techniques described herein may be implemented as part of a software product.

The vehicle information 160 may include registration information associated with the plurality of legitimate vehicles 108 and the illegitimate vehicles 138, and historic location information corresponding to the legitimate vehicles 108. For individual legitimate vehicles 108, the vehicle information 160 may include the legitimate vehicle identification number 114 of the legitimate vehicle 108, the location device identifier 126 that identifies the location device 116 associated with the legitimate vehicle 108, an owner of a legitimate vehicle 108, a make of the legitimate vehicle 108, a year of the legitimate vehicle 108, a model of the legitimate vehicle 108, administrative history associated with the legitimate vehicle 108, historical driving record information associated with the legitimate vehicle 108, one or more drivers associated of the legitimate vehicle 108, etc., or any combination thereof.

The recognition device information 162 may include information about the license plate recognition devices 106. For individual license plate recognition devices 106, the recognition device information 162 may include the recognition device identifier 148 that identifies the license plate recognition device 106, a manufacturer of the license plate recognition device 106, a firmware of the license plate recognition device 106, an operating system of license plate recognition device 106, and a maintenance record of the license plate recognition device 106. Additionally, the recognition device information 162 may include error pattern probability matrices for the license plate recognition devices 106. In some embodiments, as described herein, the error pattern probability matrices may indicate the probability that a license plate recognition device 106 misrecognizes a character of a vehicle identifier. In some embodiments, the error pattern probability matrices are based at least in part on a manufacturer of the license plate recognition device 106, a firmware of the license plate recognition device 106, an operating system of license plate recognition device 106, one or more weather conditions, and/or a maintenance record of the license plate recognition device 106.

The location device information 164 may include a record of vehicle location information (i.e. the error free location information 118 and the error containing location information 120) received from the location devices 116. Further, the recognition information 166 may include a record of vehicle identifier recognition information (i.e., the error free recognition information 144 and the error containing recognition information 146) received from the license plate recognition devices 106.

Figure 2:
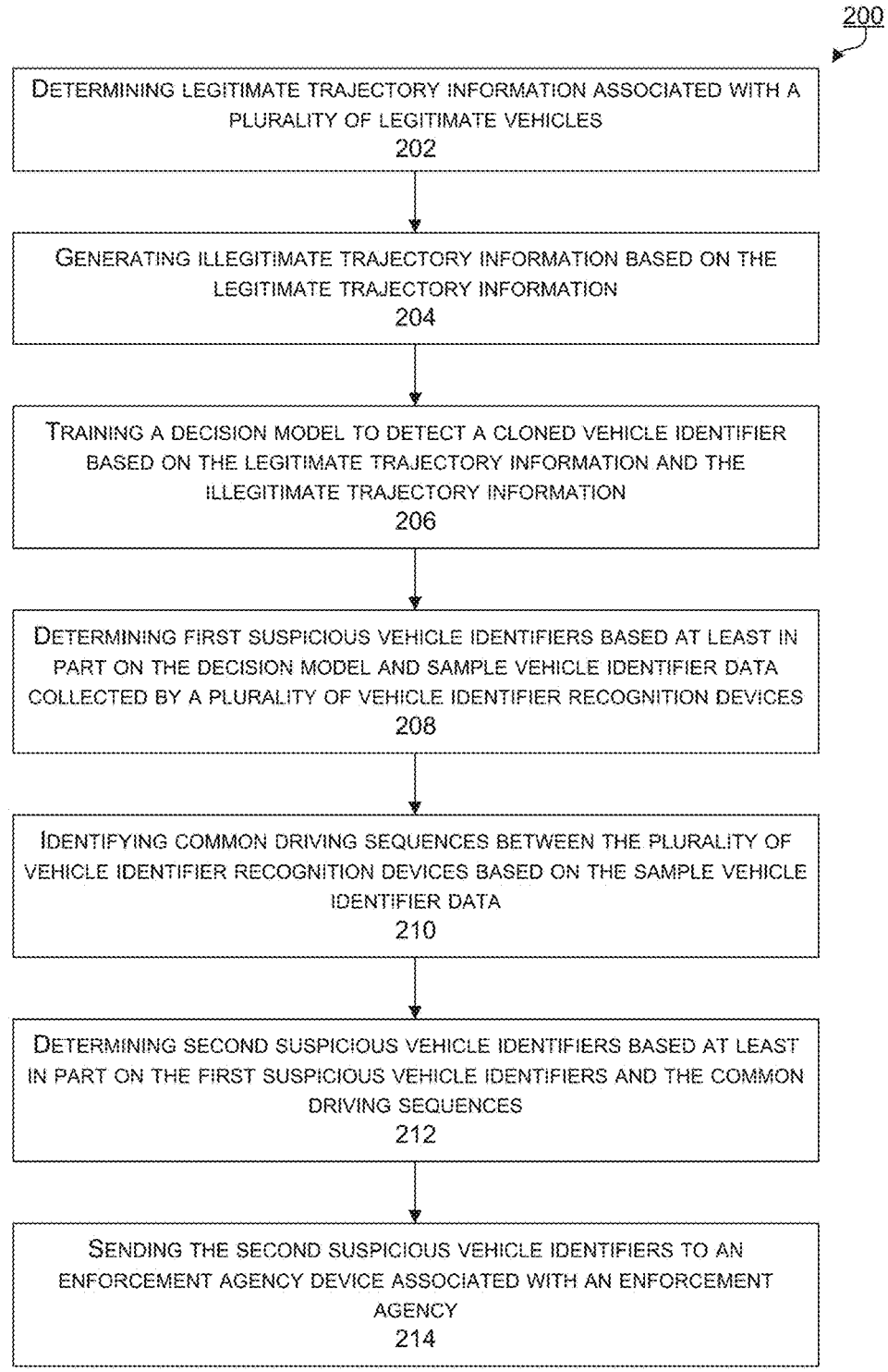
FIG. 2 is a flow diagram illustrating an example process for detecting cloned vehicle identifiers, according to some embodiments.

In addition, the cloned vehicle identifier detection server 122 may train and employ the cloned vehicle identifier detection model 168 to detect the cloned vehicle identification numbers 142 as further described with respect to FIG. 2. In some embodiments, the cloned vehicle identifier detection model 168 may identify the cloned vehicle identification numbers 142 based at least in part on the location device information 164 and the recognition information 166. Once the cloned vehicle identifier detection model 168 identifies that a legitimate vehicle identification number 114 is being used as a cloned vehicle identification number 142, the cloned vehicle identifier detection server 122 may send a notification 170 to an enforcement device 172 associated with an enforcement agent 174. In response, the enforcement agent 174 can take action to prevent the further use of a cloned vehicle identification number 142 with an illegitimate vehicle 138.

FIG. 2 is a flowchart illustrating a process 200 for detecting cloned vehicle identifiers, according to some embodiments. Process 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 202, a cloned vehicle identifier detection server 122 may determine legitimate trajectory information associated with a plurality of legitimate vehicles. In some embodiments, the cloned vehicle identifier detection server 122 may determine the legitimate trajectory information by matching the location information (e.g., the error free location information 118 and the error containing location information 120) and the vehicle identifier recognition device information (e.g., the error free recognition information 144 and the error containing recognition information 146). For example, the cloned vehicle identifier detection server 122 may receive location information from a plurality of location devices 116, and vehicle identifier recognition device information from a plurality of license plate recognition devices 106.

The location information may include a plurality of location entries. Further, individual location entries may include a location identifier (e.g., latitude and longitude) corresponding to the location of a vehicle, an identifier (e.g., the location device identifier 126) of the location device 116 that determined the location, an identifier of the vehicle associated with the location device 116, and a timestamp (e.g., the timestamp 130) indicating the time the location was determined by the location device 116.

In addition, the vehicle identifier recognition device information may include a plurality of vehicle identifier recognition entries. Individual vehicle identifier recognition entries may include a recognized identifier (e.g., vehicle identifier 150) determined by a vehicle identifier recognition device (e.g., the license plate recognition device 106), an identifier (e.g., the recognition device identifier 148) of the vehicle identifier recognition device that determined the recognized identifier, a location identifier corresponding to the location of the vehicle identifier recognition device, and/or a timestamp (e.g., timestamp 152) indicating a date and time the vehicle identifier recognition device recognized the identifier.

Further, for each vehicle identifier recognition entry corresponding to a particular vehicle identifier, the cloned vehicle identifier detection server 122 may identify the location entries associated with the vehicle identifier having a timestamp within a temporal threshold of the timestamp of the vehicle identifier recognition entry. Additionally, if a spatial difference between the location of the vehicle identifier recognition device associated with the recognition entry and at least one of the locations of the identified location entries is below a predetermined spatial threshold, the vehicle identifier recognition entry is considered to be matched by the location information. In some embodiments, the cloned vehicle identifier detection server 122 may identify legitimate vehicles according to Equation 1 as shown below:

$$P_i = \frac{m_i}{r_i} \qquad \text{Equation (1)}$$

Where $P_i$ represents the probability that a vehicle i is a legitimate vehicle, $m_i$ represents the number of vehicle identifier recognition entries of vehicle i that are matched by location entries associated with location device 116 corresponding to the vehicle i, and $r_i$ indicates the total number of vehicle identifier recognition entries corresponding to the vehicle i. When $P_i$ is greater than a predetermined legitimacy threshold, the vehicle identifier recognition entries corresponding to the vehicle identifier are included in the legitimate trajectory information. In some embodiments, the temporal threshold is equal to twenty seconds, the spatial threshold is twenty meters, and the legitimacy threshold is ninety-five percent.

At 204, the cloned vehicle identifier detection server 122 may generate illegitimate trajectory information based on the legitimate trajectory information. For example, the cloned vehicle identifier detection server 122 may generate simulated illegitimate trajectory information based on selected portions of the legitimate trajectory information. Further, the cloned vehicle identifier detection server 122 may add noise data to the simulated illegitimate trajectory information.

For instance, the cloned vehicle identifier detection server 122 may select a first plurality of vehicle identifier recognition entries from the legitimate trajectory information, where the first plurality of vehicle identifier recognition entries correspond to a first vehicle identifier from the legitimate trajectory information. Further, the cloned vehicle identifier detection server 122 may select a second plurality of vehicle identifier recognition entries from the legitimate trajectory information, where the second plurality of vehicle identifier recognition entries correspond to a second vehicle identifier from the legitimate trajectory information.

Additionally, the cloned vehicle identifier detection server 122 may combine the first plurality of vehicle identifier recognition entries and the second plurality of vehicle identifier recognition entries to create a third plurality of vehicle identifier recognition entries (i.e., the illegitimate trajectory information). In addition, the cloned vehicle identifier detection server 122 may update the recognized identifiers of the third plurality of vehicle identifier recognition entries to either the first vehicle identifier or the second vehicle identifier. In some embodiments, the first plurality of vehicle identifier recognition entries and second plurality of vehicle identifier recognition entries are selected at random.

In certain embodiments, the cloned vehicle identifier detection server 122 may further simulate recognition error in the illegitimate trajectory information. For example, the cloned vehicle identifier detection server 122 may determine an error pattern probability matrix (EPPM) that represents available license plate characters (i.e. a letter or a number), and the corresponding probabilities that the character is misrecognized as another character. In some embodiments, the cloned vehicle identifier detection server 122 may construct the EPPM according to equation 2 as defined below:

$$p(w_i \mid w_j) = \frac{c_{i,j} + 1}{\sum_{k \in Z, k \neq j} c_{k,j} + n} \qquad \text{Equation (2)}$$

Where $w_i$ represents the character as recognized by the license plate recognition device, $w_j$ represents the actual character on the license plate, and $p(w_i|w_j)$ represents the probability of $w_j$ be misrecognized as $w_i$. Further, $c_{ij}$ is the frequency (number of times) that $w_j$ is misrecognized as $w_i$, and Z denotes the character set of all available license plate characters, the character set being of size n. To prevent irregular behavior that may be caused by a zero value of $c_{ij}$, additive smoothing may be used, in some embodiments, such that a value of 1 may be added to the numerator (add-one smoothing), and a value of n may be added to the denominator, maintaining expected values relative to the size of the possible character set, and keeping $p(w_i|w_j)$ as Laplace-smooth categorical data.

In some examples, the cloned vehicle identifier detection server 122 may generate an EPPM for individual license plate recognition devices 106. An EPPM generated by the cloned vehicle identifier detection server 122 is shown below in Table 1. The probability values in the EPPM may be static, in some embodiments, as derived from a fixed set of rules for optical character misrecognition or misidentification with certain sets of glyphs in license plates, for example. In other embodiments, the EPPM values may be dynamically updated based on empirical evidence, training sets, calibration sets, other real-time data collection, and/or manual input. Further, some embodiments may require each row and each column of the EPPM to sum to a value of 1.

TABLE 1

Error Pattern Probability Matrix (EPPM)

|  |  | Misidentified Character | | | | | | |
| --- | --- | --- | --- | --- | --- | --- | --- | --- |
|  |  | A | B | ... | Z | 0 | ... 8 | 9 |
| Actual | A | — | 0.02 | ... | 0.01 | 0 | ... 0 | 0 |
| Character | B | 0.01 | — | ... | 0.02 | 0.4 | ... 0.4 | 0.2 |
|  | ... | ... | ... | | ... | ... | ... | |
|  | Z | 0.02 | 0.01 | ... | — | 0.01 | ... 0 | 0 |
|  | 0 | 0.3 | 0.1 | ... | 0 | — | ... 0.3 | 0.1 |
|  | ... | ... | ... | | ... | ... | — | |
|  | 8 | 0.01 | 0.57 | ... | 0.01 | 0.1 | ... — | 0.2 |
|  | 9 | 0 | 0.01 | ... | 0.01 | 0.05 | ... 0.1 | — |

Further, the cloned vehicle identifier detection server 122 may apply the EPPM to the third plurality of recognition entries in order to simulate misrecognition of vehicle identifier characters in the illegitimate trajectory information. For instance, cloned vehicle identifier detection server 122 may randomly select a recognition entry of the third plurality of recognition entries, and randomly apply the EPPM to the characters of the recognized identifier of the vehicle identifier recognition entry. After the EPPM has been applied to simulated sets of vehicle identifier recognition entries, the resulting vehicle identifier recognition entries may be used as illegitimate trajectory information.

At 206, the cloned vehicle identifier detection server 122 may train a decision model to detect a cloned vehicle identifier based on the legitimate trajectory information and the illegitimate trajectory information. For example, the cloned vehicle identifier detection server 122 may employ machine learning techniques to build classification models (e.g., the cloned vehicle identifier detection model 168) for predicting whether a vehicle identifier has been cloned. In some instances, the cloned vehicle identifier detection server 122 may construct a decision tree model comprised of a tree structures that classify input data by sorting the input data down the tree from the root to a leaf node. Each non-leaf node in the tree may specify a test of some feature of input data.

In some embodiments, the cloned vehicle identifier detection server 122 may construct a decision tree model by determining the features that provide the highest information gain (i.e., the most homogeneous branches). In some embodiments, the information gain may be based on the decrease in entropy after a dataset is split on an input feature, and may be defined according to equation 3 as defined below.

$$H = -\sum_{i=1}^{n} p(x_i)\log_2 p(x_i) \qquad \text{Equation (3)}$$

Where n represents a class number, and $p(x_i)$ represents the probability of occurrence of the input feature $x_1$. At each node of the tree, this calculation is performed for every input feature, and the input feature with the largest information gain is chosen for the split. This process is applied recursively from the root-node down, and is complete when no further partitioning is possible or when a single class can be applied to a branch.

In some embodiments, the input features to the decision trees include an amount of instances a vehicle travels over predetermined speed between two of the license plate recognition devices 106; an amount of instances a vehicle identifier associated with the vehicle is recognized by the license plate recognition devices 106; and/or a percentage of instances a vehicle identifier associated with vehicle is recognized by the license plate recognition devices 106 matches location information associated with the vehicle.

The amount of instances a vehicle travels over predetermined speed between two of the license plate recognition devices 106 may be determined from the timestamps of individual vehicle identifier recognition entries corresponding to a vehicle. Additionally, the amount of instances a vehicle identifier associated with the vehicle is recognized by the plurality of vehicle identifier recognition devices may be determined from the vehicle identifier recognition entries. Further, the percentage of instances a vehicle identifier associated with vehicle is recognized by the license plate recognition devices 106 matches location information associated with the vehicle may be determined based at least in part on the location information (e.g., the error free location information 118 and the error containing location information 120) received from the vehicle, and vehicle identifier recognition device information (e.g., the error free recognition information 144 and the error containing recognition information 146) associated with the vehicle identifier corresponding to the vehicle.

At 208, the cloned vehicle identifier detection server 122 may determine first suspicious vehicle identifiers based at least in part on the decision model and sample vehicle identifier data collected by a plurality of vehicle identifier recognition devices. For example, the recognition information 146 collected by the license plate recognition devices 106 may be classified by the cloned vehicle identifier detection model 168 to determine potentially cloned vehicle identifiers.

At 210, the cloned vehicle identifier detection server 122 may identify common driving sequences between the vehicle identifier recognition devices based on the sample vehicle identifier data. For example, the cloned vehicle identifier detection server 122 may identify common driving sequences of vehicles traveling between the driving stations 102 using the recognition information 146.

In some instances, common driving sequences may be composed of three driving stations, and obtained by combining driving station pairs. For example, a first station pair $(S_{i-1}, S_i)$ may be combined with a second station pair $(S_i, S_{i+1})$ to form a driving sequence $(S_{i-1}, S_i, S_{i+x})$. Further, the cloned vehicle identifier detection server 122 may identify a driving sequence as common based at least in part on $c_{ij} > \mu$ and $p(S_{i+1}|S_i) > p$. Where $c_{ij}$ represents the number of cars that sequentially pass from $S_i$ to $S_{i+1}$, and $p(S_{i+1}|S_i)$ represents the probability that a vehicle travels from $S_i$ to $S_{i+1}$ and is defined according to equation 4 as defined below. In some embodiments, the probability criteria p is set to 0.1, and $\mu$ is set to 30.

$$p(S_{i+1} | S_i) = \frac{c_{i,i+1}}{\sum_{j \in S} c_{ij}} \quad \text{Equation (4)}$$

At 212, the cloned vehicle identifier detection server 122 may determine second suspicious vehicles based at least in part on the first suspicious vehicles and the common driving sequences. In some examples, the decision model may incorrectly include vehicle identifiers that have not been cloned in the list of suspicious vehicle identifiers as the simulated illegitimate trajectory information does not fully capture the entire noise or error patterns of the license plate recognition devices 106. As a result, in some embodiments, the cloned vehicle identifier detection server 122 may rank the first suspicious vehicles by the amount of common driving sequences present in the trajectory information corresponding to the suspicious vehicles to generate a sorted list of suspicious vehicles.

For example, the cloned vehicle identifier detection server 122 may determine vehicle trajectory information corresponding to the suspicious vehicle identifiers. In some embodiments, for each suspicious vehicle identifier, the cloned vehicle identifier detection server 122 may determine whether the vehicle identifier recognition entries corresponding to the suspicious vehicle identifier have a matching location entry based on a spatial threshold and temporal threshold. Further, the cloned vehicle identifier detection server 122 may analyze unmatched vehicle identifier recognition entries corresponding to the suspicious vehicle identifier to determine whether the vehicle identifier has been cloned. For instance, the cloned vehicle identifier detection server 122 may determine the amount of common driving sequences within the unmatched vehicle identifier recognition entries. Additionally, the cloned vehicle identifier detection server 122 may rank the suspicious vehicle identifiers based on the amount of common driving sequences identified within the unmatched vehicle identifier recognition entries.

At 214, the cloned vehicle identifier detection server 122 may send the second suspicious vehicles to an enforcement agency device associated with an enforcement agent. For example, the cloned vehicle identifier detection server 122 may select the higher ranked vehicle identifiers of the sorted list as potentially cloned vehicle identifiers. Further, the cloned vehicle identifier detection server 122 may send the selected vehicle identifiers to a plurality of enforcement devices 172. In some instances, the enforcement agents 174 associated with the enforcement devices 172 may detain vehicles having a license plate (e.g., the license plates 112 and the license plates 140) with one of the selected vehicle identifiers. In some other instances, the enforcement devices 172 may flag vehicles having a license plate with one of the selected vehicle identifiers when a license plate recognition device 106 associated with an enforcement device 172 detects the selected vehicle identifiers at the driving station 102.

Additionally, or alternatively, the cloned vehicle identifier detection server 122 may display the selected vehicle identifiers on a display interface connected to the cloned vehicle identifier detection server 122. Further, the cloned vehicle identifier detection server 122 may visually identify recent locations of vehicles having a license plate including one of the selected vehicle identifiers based upon location information (e.g., the error free location information 118 and the error containing location information 120), and vehicle identifier recognition device information (e.g., the error free recognition information 144 and the error containing recognition information 146).

Figure 3:
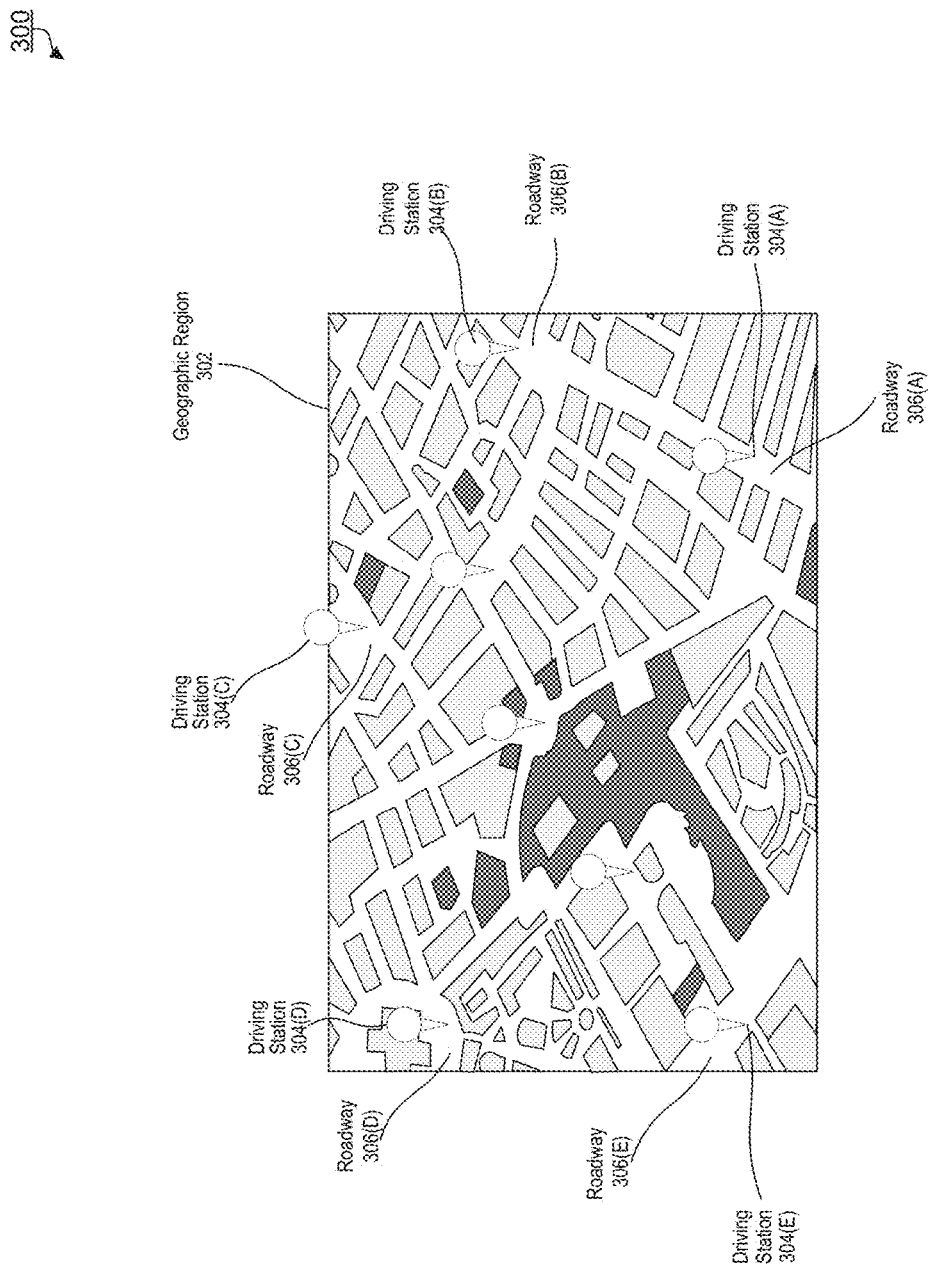
FIG. 3 illustrates a geographic region including a plurality of driving stations equipped with license plate recognition devices, according to some embodiments.

FIG. 3 illustrates a geographic region 302 including a plurality of driving stations 304 (not all of which are numbered, for the sake of clarity, driving stations may also be called license plate recognition stations, in some embodiments) equipped with license plate recognition devices, according to exemplary embodiments. In the example of FIG. 3, the geographic region 302 includes roadways 306 (not all of which are numbered, for the sake of clarity) for vehicular traffic. Further, in the example of FIG. 3, the driving stations 304 (e.g., driving stations 104) may be located along the roadways 306 for collection of vehicular information. As described herein, the driving stations 304 may include vehicle identifier recognition devices (e.g., license plate recognition devices 106) for collection of the vehicular information.

It should be appreciated that the framework described herein may be implemented as a method, process, apparatus, system, or article of manufacture such as a non-transitory computer-readable medium or device. For illustration purposes, the present framework may be described in the context of license plate recognition. It should be appreciated, however, that the present framework may also be applied in processing other types of recognition data that identifies other types of objects or text.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

The data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, VS, jQuery, Dojo, Dijit, OpenUIS, AngularJS, Express.js, Backbonejs, Ember.js, DHTMLX, React, Electron, among many other non-limiting examples.

Figure 4:
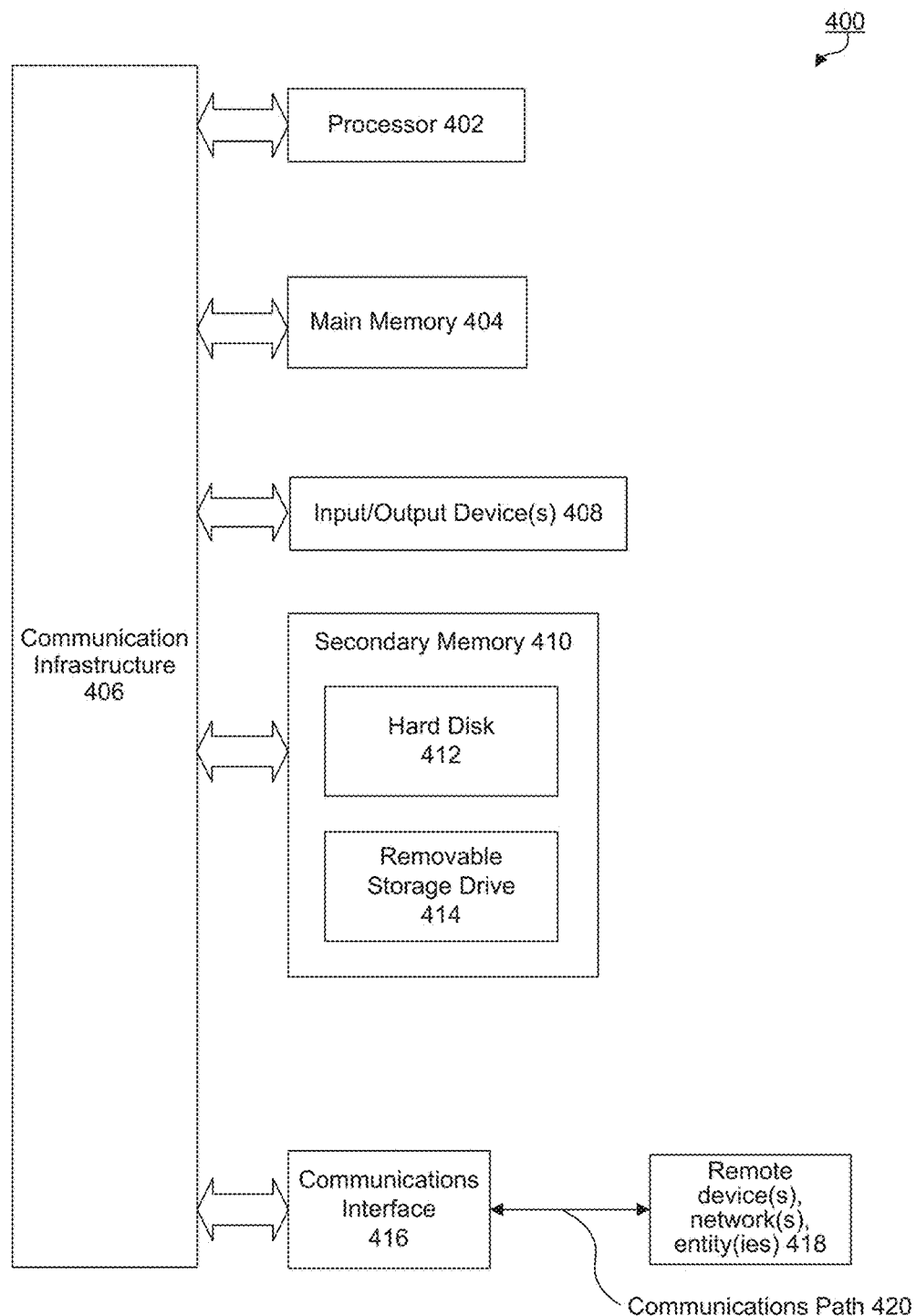
FIG. 4 illustrates select components of an example computer system useful for implementing various embodiments.

FIG. 4 is an example computer system 400 useful for implementing various embodiments. Various embodiments can be implemented, for example, using one or more well-known computer systems, such as the cloned vehicle identifier detection server 122 shown in FIG. 1. Computer system 400 can be used, for example, to implement method 300 of FIG. 3 as well as cloned vehicle identifier detection server 122 (and/or other modules of FIG. 1). For example, computer system 400 can determine that a legitimate vehicle identification number is being used as a cloned vehicle identification number on the license plate of an illegitimate vehicle. The computer system 400 can be any well-known computer capable of performing the functions described herein.

The computer system 400 includes one or more processors 402 (also called central processing units, or CPUs), main memory 404, and a communication infrastructure 406 connected to the processors 402 and the main memory 404.

In some examples, the one or more processors 402 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

As illustrated in FIG. 4, the main memory 404 may include volatile memory, such as random access memory (RAM). In addition, the main memory 404 may include one or more levels of cache. Additionally, the main memory 404 has stored therein control logic (i.e., computer software) and/or data.

The computer system 400 may further be equipped with various input/output (I/O) devices 408. Such I/O devices include a display, various user interface controls (e.g., buttons, joystick, keyboard, mouse, touch screen, etc.), audio speakers, connection ports and so forth.

The computer system 400 may also include one or more secondary storage devices or memory 410. The secondary memory 410 may include, for example, a hard disk drive 412 and/or a removable storage device or drive 414. The removable storage drive 414 may be a floppy disk drive, a magnetic tape drive, a compact disk drive, an optical storage device, tape backup device, and/or any other storage device/drive. In some examples, the removable storage drive 414 may interact with a removable storage media. Some examples of removable storage media may include a floppy disk, magnetic tape, compact disk, DVD, optical storage disk, and/any other computer data storage device. The removable storage drive 414 reads from and/or writes to removable storage media in a well-known manner. Depending on the configuration of the computer system 400, the secondary memory 410 may be a type of computer-readable storage media and/or may be a tangible non-transitory media to the extent that when mentioned, non-transitory computer-readable media exclude media such as energy, carrier signals, electromagnetic waves, and signals per se.

According to an exemplary embodiment, the secondary memory 410 may include other means, instrumentalities or other approaches for allowing computer programs and/or other instructions and/or data to be accessed by computer system 400. Such means, instrumentalities or other approaches may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 400 may further include a communication or network interface 416. The communication interface 416 enables the computer system 400 to communicate and interact with any combination of remote devices, remote networks, remote entities, etc. (individually and collectively referenced by reference number 418). For example, the communication interface 416 may allow the computer system 400 to communicate with remote devices 418 over the communication(s) path 420, which may be wired and/or wireless, and which may include any combination of LANs, WANs, the Internet, etc. Control logic and/or data may be transmitted to and from the computer system 400 via the communication(s) path 420.

In an embodiment, a tangible apparatus or article of manufacture comprising a tangible computer useable or readable medium having control logic (software) stored thereon is also referred to herein as a computer program product or program storage device. This includes, but is not limited to, the computer system 400, the main memory 404, the secondary memory 410, and the removable storage drive 414, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   determining legitimate trajectory information associated with a plurality of legitimate vehicles;
   generating illegitimate trajectory information based on the legitimate trajectory information;
   training a decision model to detect a cloned vehicle identifier based on the legitimate trajectory information and the illegitimate trajectory information;
   identifying sample vehicle identifier data collected by a plurality of vehicle identifier recognition devices;
   determining first suspicious vehicle identifiers based at least in part on the decision model and the sample vehicle identifier data;
   identifying common driving sequences between the plurality of vehicle identifier recognition devices based on the sample vehicle identifier data;
   determining second suspicious vehicle identifiers based at least in part on the first suspicious vehicle identifiers and the common driving sequences; and
   sending the second suspicious vehicle identifiers to an enforcement agency device associated with an enforcement agent.

2. The computer-implemented method of claim 1, wherein the determining legitimate trajectory information associated with the plurality of legitimate vehicles comprises:
   for an individual vehicle of the plurality of legitimate vehicles:
   receiving location data determined by a location device of the individual vehicle, the location data including a first location identifier and a first timestamp associated with a presence of the individual vehicle at a first location corresponding to the first location identifier;
   receiving training vehicle identifier data determined by a vehicle identifier recognition device of the plurality of vehicle identifier recognition devices, the training vehicle identifier data including a second timestamp associated with the presence of the individual vehicle at a second location corresponding to the vehicle identifier recognition device; and
   matching the location data with the training vehicle identifier data based on at least one of a difference between the first timestamp and the second timestamp being less than a predetermined temporal threshold or a distance between the first location and second location being less than a predetermined spatial threshold.

3. The computer-implemented method of claim 2, wherein the location device is a global position system device.

4. The computer-implemented method of claim 1, wherein the generating illegitimate trajectory information based on the legitimate trajectory information, comprises:
   identifying a first set of vehicle identifier recognition entries of the legitimate trajectory information, the first set of vehicle identifier recognition entries corresponding to a first vehicle having a first vehicle identifier;
   identifying a second set of vehicle identifier recognition entries of the legitimate trajectory information, the second set of vehicle identifier recognition entries corresponding to a second vehicle having a second vehicle identifier;
   combining the first set of vehicle identifier recognition entries and the second set of vehicle identifier recognition entries to create a simulated set of vehicle identifier recognition entries; and
   setting a simulated set vehicle identifier within the simulated set of vehicle identifier recognition entries to one of the first vehicle identifier or the second vehicle identifier.

5. The computer-implemented method of claim 4, wherein the generating illegitimate trajectory information based on the legitimate trajectory information, further comprises:
   determining a probabilistic representation of character misrecognition by the plurality of vehicle identifier recognition devices; and
   applying the probabilistic representation of character misrecognition to the simulated set of vehicle identifier recognition entries to generate the illegitimate trajectory information.

6. The computer-implemented method of claim 5, wherein the probabilistic representation of character misrecognition is an error pattern probability matrix.

7. The computer-implemented method of claim 1, wherein the decision model includes a decision tree.

8. The computer-implemented method of claim 7, wherein features of the decision tree include at least one of:
 a first amount of instances a vehicle travels over predetermined speed between the plurality of vehicle identifier recognition devices;
 a second amount of instances a captured vehicle identifier associated with the vehicle is recognized by the plurality of vehicle identifier recognition devices; and
 a percentage of instances the captured vehicle identifier associated with the vehicle is recognized by the plurality of vehicle identifier recognition devices matches location information associated with the vehicle.

9. A non-transitory computer-readable device having instructions stored thereon that, when executed by at least one computing device, causes the at least one computing device to perform operations comprising:
 determining legitimate trajectory information associated with a plurality of legitimate vehicles;
 generating illegitimate trajectory information based on the legitimate trajectory information;
 training a decision model to detect a cloned vehicle identifier based on the legitimate trajectory information and the illegitimate trajectory information;
 identifying sample vehicle identifier data collected by a plurality of vehicle identifier recognition devices;
 determining first suspicious vehicle identifiers based at least in part on the decision model and the sample vehicle identifier data;
 identifying common driving sequences between the plurality of vehicle identifier recognition devices based on the sample vehicle identifier data;
 determining second suspicious vehicle identifiers based at least in part on the first suspicious vehicle identifiers and the common driving sequences; and
 sending the second suspicious vehicle identifiers to an enforcement agency device associated with an enforcement agent.

10. The non-transitory computer-readable device of claim 9, wherein the determining legitimate trajectory information associated with the plurality of legitimate vehicles comprises further comprises:
 for an individual vehicle of the plurality of legitimate vehicles:
  receiving location data determined by a location device of the individual vehicle, the location data including a first location identifier and a first timestamp associated with a first presence of the individual vehicle at a first location corresponding to the first location identifier;
  receiving training vehicle identifier data determined by a vehicle identifier recognition device of the plurality of vehicle identifier recognition devices, the training vehicle identifier data including a second timestamp associated with a second presence of the individual vehicle at a second location corresponding to the vehicle identifier recognition device; and
  matching the location data with the training vehicle identifier data based on at least one of a difference between the first timestamp and the second timestamp being less than a predetermined temporal threshold or a distance between the first location and second location being less than a predetermined spatial threshold.

11. The non-transitory computer-readable device of claim 10, wherein the location device is a global position system device.

12. The non-transitory computer-readable device of claim 9, wherein the generating illegitimate trajectory information based on the legitimate trajectory information, comprises:
 identifying a first set of vehicle identifier recognition entries of the legitimate trajectory information, the first set of vehicle identifier recognition entries corresponding to a first vehicle having a first vehicle identifier;
 identifying a second set of vehicle identifier recognition entries of the legitimate trajectory information, the second set of vehicle identifier recognition entries corresponding to a second vehicle having a second vehicle identifier;
 combining the first set of vehicle identifier recognition entries and the second set of vehicle identifier recognition entries to create a simulated set of vehicle identifier recognition entries; and
 setting a simulated set vehicle identifier within the simulated set of vehicle identifier recognition entries to one of the first vehicle identifier or the second vehicle identifier.

13. The non-transitory computer-readable device of claim 12, wherein the generating illegitimate trajectory information based on the legitimate trajectory information, further comprises:
 determining a probabilistic representation of character misrecognition by the plurality of vehicle identifier recognition devices; and
 applying the probabilistic representation of character misrecognition to the simulated set of vehicle identifier recognition entries to generate the illegitimate trajectory information.

14. The non-transitory computer-readable device of claim 13, wherein the probabilistic representation of character misrecognition is an error pattern probability matrix.

15. The non-transitory computer-readable device of claim 9, wherein the decision model includes a decision tree, and features of the decision tree include at least one of:
 a first amount of instances a vehicle travels over predetermined speed between the plurality of vehicle identifier recognition devices;
 a second amount of instances a captured vehicle identifier associated with the vehicle is recognized by the plurality of vehicle identifier recognition devices; and
 a percentage of instances the captured vehicle identifier associated with the vehicle is recognized by the plurality of vehicle identifier recognition devices matches location information associated with the vehicle.

16. A cloned vehicle identifier detection system, comprising:
 a memory; and
 at least one processor coupled to the memory and configured to:
  determine legitimate trajectory information associated with a plurality of legitimate vehicles;
  generate illegitimate trajectory information based on the legitimate trajectory information;
  train a decision model to detect a cloned vehicle identifier based on the legitimate trajectory information and the illegitimate trajectory information;
  identify sample vehicle identifier data collected by a plurality of vehicle identifier recognition devices;

determine first suspicious vehicle identifiers based at least in part on the decision model and the sample vehicle identifier data;

identify common driving sequences between the plurality of vehicle identifier recognition devices based on the sample vehicle identifier data; and determine second suspicious vehicle identifiers based at least in part on the first suspicious vehicle identifiers and the common driving sequences.

17. The cloned vehicle identifier detection system of claim 16, wherein to generate the illegitimate trajectory information based on the legitimate trajectory information, the at least one processor is further configured to:

identify a first set of vehicle identifier recognition entries of the legitimate trajectory information, the first set of vehicle identifier recognition entries corresponding to a first vehicle having a first vehicle identifier;

identify a second set of vehicle identifier recognition entries of the legitimate trajectory information, the second set of vehicle identifier recognition entries corresponding to a second vehicle having a second vehicle identifier;

combine the first set of vehicle identifier recognition entries and the second set of vehicle identifier recognition entries to create a simulated set of vehicle identifier recognition entries; and set a simulated set vehicle identifier within the simulated set of vehicle identifier recognition entries to one of the first vehicle identifier or the second vehicle identifier.

18. The cloned vehicle identifier detection system of claim 17, wherein to generate the illegitimate trajectory information based on the legitimate trajectory information, the at least one processor is further configured to:

determine a probabilistic representation of character misrecognition by the plurality of vehicle identifier recognition devices; and apply the probabilistic representation of character misrecognition to the simulated set of vehicle identifier recognition entries to generate the illegitimate trajectory information.

19. The cloned vehicle identifier detection system of claim 16, wherein the decision model includes a decision tree, and features of the decision tree include at least one of:

a first amount of instances a vehicle travels over predetermined speed between the plurality of vehicle identifier recognition devices;

a second amount of instances a captured vehicle identifier associated with the vehicle is recognized by the plurality of vehicle identifier recognition devices; and a percentage of instances the captured vehicle identifier associated with the vehicle is recognized by the plurality of vehicle identifier recognition devices matches location information associated with the vehicle.

20. The cloned vehicle identifier detection system of claim 16, wherein the plurality of vehicle identifier recognition devices include a license plate recognition device.

* * * * *